S. P. FAIRCHILD.
AUTOMOBILE CRANKING DEVICE.
APPLICATION FILED OCT. 12, 1917.
1,268,336. Patented June 4, 1918.
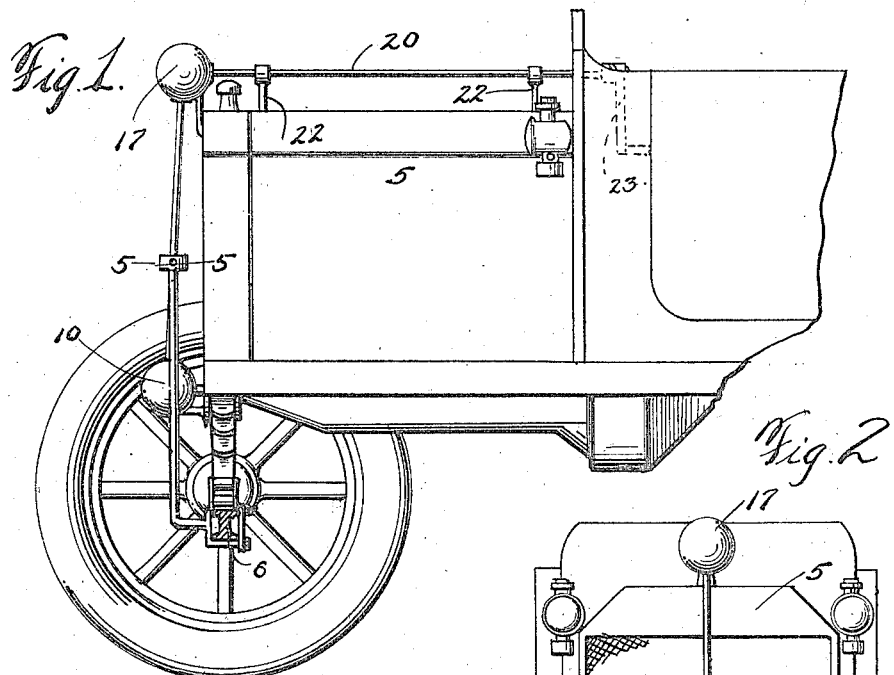
Fig. 1.
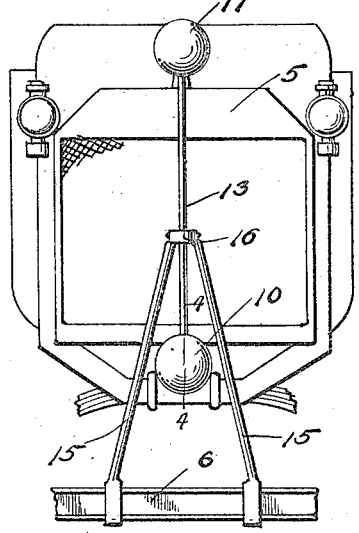
Fig. 2.
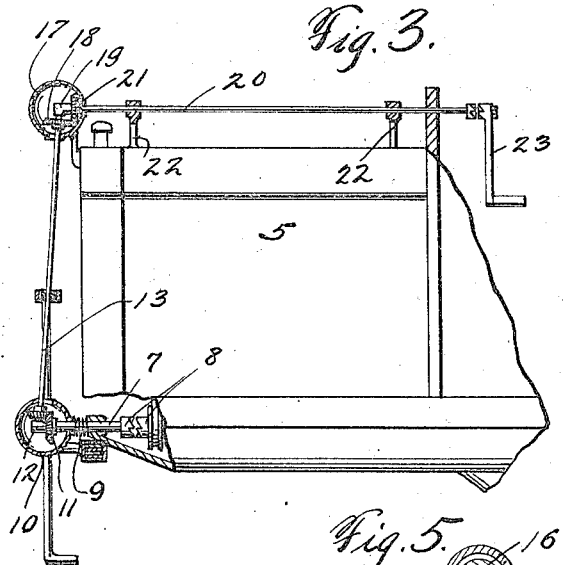
Fig. 3.
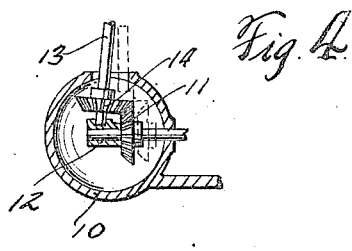
Fig. 4.
Fig. 5.
Witnesses
Inventor
S. P. Fairchild
By
Attorney

UNITED STATES PATENT OFFICE.

SAMUEL P. FAIRCHILD, OF SHERIDAN, MONTANA.

AUTOMOBILE CRANKING DEVICE.

1,268,336.  Specification of Letters Patent.  Patented June 4, 1918.

Application filed October 12, 1917. Serial No. 196,228.

*To all whom it may concern:*

Be it known that I, SAMUEL P. FAIRCHILD, a citizen of the United States, residing at Sheridan, in the county of Madison, State of Montana, have invented certain new and useful Improvements in Automobile Cranking Devices; and I do hereby declare the following to be a full, clear, and exact description of the invention, such as will enable others skilled in the art to which it appertains to make and use the same.

This invention is an improvement in motor vehicles and has particular reference to a cranking device for the engines thereof.

An object of the invention is to provide a simple and inexpensive apparatus adapted to be connected to the crank shaft of the engine in such a manner as to enable the operator to crank the engine from the driver's seat and thus avoid the necessity of dismounting.

The inventive idea involved is capable of receiving a variety of mechanical expressions, one of which, for the purpose of illustrating the invention, is shown in the accompanying drawing, wherein:—

Figure 1 is a fragmentary side elevation of an automobile showing the invention applied thereto.

Fig. 2 is a front elevation.

Fig. 3 is a vertical sectional view through the cranking device.

Fig. 4 is an enlarged section on the line 4—4 of Fig. 2.

Fig. 5 is a similar section on the line 5—5 of Fig. 1.

In the drawing the numeral 5 indicates the hood of an automobile engine which is supported above the usual front axle 6 and extending rearwardly from a point adjacent said axle is the crank shaft 7 of the engine having the usual clutch members 8 and also having associated therewith the coil spring 9 for normally retaining said clutch members out of engagement with each other.

The forward section of the crank shaft 7 is slidable in a housing 10 adjacent the front end thereof. Fixed to the shaft 7 within the housing 10 is a bevel gear 11 and also secured to said shaft adjacent said gear is a bearing 12 in which the lower end of a vertically disposed shaft 13 is swivelly mounted. This shaft 13 extends upwardly through the housing 10 and has fixed thereto within said housing a bevel gear 14 which meshes with the gear 11. The front axle 6 of the vehicle supports a frame consisting of upwardly converging arms 15 which are provided at their upper ends with a pivotally mounted bearing 16 which not only permits of the rotary movement of the shaft 13 but also supports the same pivotally intermediate its ends so as to allow the oscillation thereof.

The upper end of the shaft 13 extends into a housing 17 similar in construction to the housing 10 and has fixed thereon within said housing the bevel gear 18, the upper end of said shaft having a swivel mounting in a bearing 19 fixed to the horizontally disposed rod 20. This rod also has fixed thereto within the housing 17 a bevel gear 21 which meshes with the gear 18 and said rod 20 is slidable within the housing and mounted in bearings 22 carried by the hood 5 of the vehicle. This rod 20 extends rearwardly to a point adjacent the driver's seat where the same is provided with a crank handle 23 which is adapted to be grasped by the operator in order to initially force the rod 20 forwardly a very slight distance in order to oscillate the shaft 13 and thus cause the forward section of the crank shaft 7 to move rearwardly against the tension of the spring 9 and thereby produce engagement between the clutch members 8. The crank handle is then rotated in a counter-clockwise direction which will rotate the shaft 7 to crank the engine after which the spring 9 will return the parts to their normal positions.

What is claimed is:—

1. In a cranking device for motor vehicles, the combination with the crank shaft; a gear carried thereby, an oscillatory and a rotatable shaft associated with said crank shaft and having a gear thereon adapted to mesh with the first named gear, another gear carried by said oscillatory and rotatable shaft, a slidable rod pivotally connected to the last named shaft and having a gear thereon meshing with the last named gear, and means for sliding and rotating said rod whereby to oscillate the last named shaft and operate said gears to rotate the crank shaft.

2. A cranking device for motor vehicles, the combination with the front axle of the vehicle, and the crank shaft of the engine; of a frame supported by said axle and having a pivotal bearing at its upper end, a vertically disposed shaft rotatably mounted in said bearing and adapted for oscillatory movement therein, a housing for the upper and lower ends of said shaft, gearing within said housing and connected with said crank shaft whereby to rotate the same, and a rod slidably mounted in the upper housing and extending longitudinally of the hood of the motor vehicle to a point adjacent the driver's seat and connected to said vertically disposed shaft for oscillating and rotating the same to cause an engagement of the clutch members of the crank shaft and also operate said gearing to rotate said crank shaft.

In testimony whereof, I affix my signature in the presence of two witnesses.

SAMUEL P. FAIRCHILD.

Witnesses:
 WALTER W. BUFORD,
 LAURA A. DOUGLASS.

Copies of this patent may be obtained for five cents each, by addressing the "Commissioner of Patents, Washington, D. C."